(12) United States Patent
Urch

(10) Patent No.: US 6,434,963 B1
(45) Date of Patent: Aug. 20, 2002

(54) AIR COOLING/HEATING APPARATUS

(76) Inventor: John Francis Urch, 5 Marlo Road, Cronulla, NSW 2230 (AU)

( * ) Notice: Subject to any disclaimer, the term of this patent is extended or adjusted under 35 U.S.C. 154(b) by 0 days.

(21) Appl. No.: 09/427,465

(22) Filed: Oct. 26, 1999

(51) Int. Cl.$^7$ .......................... F25B 29/00; F25D 17/04; F24F 3/00; F24F 3/06; F28C 3/08

(52) U.S. Cl. ................................. 62/279; 62/93; 62/95; 62/305; 62/309; 62/271; 62/314; 165/66; 165/54; 165/60

(58) Field of Search ............................. 165/54, 66, 60; 62/279, 280, 93, 95, 305, 309, 271, 314

(56) References Cited

U.S. PATENT DOCUMENTS

| | | | | |
|---|---|---|---|---|
| 2,259,541 A | * | 10/1941 | Ballard ...................... | 62/280 |
| 2,268,846 A | * | 1/1942 | Roper ........................ | 62/279 |
| 2,825,210 A | * | 3/1958 | Carr .......................... | 165/54 |
| 3,306,067 A | * | 2/1967 | Anglin | |
| 3,427,005 A | * | 2/1969 | Kuykendall | |
| 3,651,660 A | * | 3/1972 | Quiros ...................... | 62/279 |
| 3,984,995 A | * | 10/1976 | Starr et al. | |
| 4,067,205 A | * | 1/1978 | Mayhue ...................... | 62/279 |
| 4,071,080 A | * | 1/1978 | Bridgers .................... | 165/66 |
| 4,938,035 A | * | 7/1990 | Dinh .......................... | 62/279 |
| 5,829,513 A | * | 11/1998 | Urch .......................... | 165/54 |
| 5,927,097 A | * | 7/1999 | Wright ........................ | 62/314 |

FOREIGN PATENT DOCUMENTS

| | | | | |
|---|---|---|---|---|
| DE | 2360068 | * | 10/1975 | ............... 165/54 |
| DE | 2509038 | * | 9/1976 | ............... 165/54 |
| DE | 3006318 | * | 8/1981 | ............... 165/54 |
| DE | 3023531 | * | 1/1982 | ............... 165/64 |
| DE | 3027447 | * | 2/1982 | ............... 165/54 |
| EP | 0366642 | * | 5/1990 | ............... 165/54 |
| FR | 2338460 | * | 8/1981 | ............... 165/54 |
| JP | 0071937 | * | 4/1984 | ............... 62/279 |
| JP | 0147939 | * | 8/1984 | ............... 62/279 |
| JP | 401318820 | * | 12/1989 | ............... 165/54 |
| WO | 95/33960 | | 12/1995 | |
| WO | 96/32611 | | 10/1996 | |
| WO | 99/04203 | | 1/1999 | |

* cited by examiner

*Primary Examiner*—John K. Ford
(74) *Attorney, Agent, or Firm*—Smith-Hill and Bedell

(57) ABSTRACT

An air cooler has a casing containing two air flow paths through one of which cooled fresh air is supplied to a house, while the other receives stale air from the house. An efficient heat exchanger pre-cools the fresh air with the heat extracted from the stale air, Further cooling is achieved by evaporative cooling of water from two honeycomb structures respectively spanning the two air flow paths. A pump circulates cooled water to the upper end of one of the structures from the lower end of the other structure which receives, at its upper end, the water which has percolated down through the upper structure.

6 Claims, 1 Drawing Sheet

AIR COOLING/HEATING APPARATUS

FIELD OF THE INVENTION

This invention relates to an apparatus for providing a stream of fresh air to an enclosed space, and more particularly, to an apparatus for providing a stream of cooled or heated fresh air to an enclosed space.

BACKGROUND TO THE INVENTION

Air to air heat exchangers are becoming increasingly important to reduce the cost of cooling or heating air supply fed to an enclosed se such as a building. Such heat exchangers are required to handle relatively high air-flow rates (often in the range of 500 to 5000 liters per second) and to transfer heat with relatively high thermal efficiency between the two mutually-isolated air flow circuits of the heat exchanger. Fresh air is supplied to the enclosed space through one of these circuits while simultaneously stale air is withdrawn from the space and is conveyed through the other circuit.

It is customary to maintain a slight positive pressure in the enclosed space to prevent ambient air at a different temperature to that desired, entering the enclosed space when an access door is temporarily opened. However the rate of air flow through the two circuits is conventionally of much the same order to achieve total air replacement, as it only requires a slightly greater flow of the air into the confined space to maintain the slight increase in air pressure within it.

It is an object of the present invention to o e or ameliorate at least one of the disadvantages of the prior art or to provide a useful alternative

SUMMARY OF THE INVENTION

The present invention provides an apparatus for supplying a stream of fresh air to an enclosed space whilst simultaneously withdrawing a stream of stale air from the space said apparatus having a heat exchanger with mutually isolated primary and secondary air flow circuits and adapted to provide heat transfer between said primary and secondary air flow circuits, with one of the circuits connected to receive a steam of fresh and the other circuit connected to receive a stream of stale air at a different temperature from that of the fresh air stream; the apparatus further including a refrigeration circuit having two separate hear exchange units which are respectively arranged at the air outlets of the two air flow circuits.

Advantageously, the present invention provides for an improvement in the thermal efficiency of an air flow heat exchanger having isolated and primary and secondary circuits between which good heat-transfer characteristics occur and forming part of apparatus for providing a stream of fresh to an enclosed at a desired temperature The invention is especially, although not exclusively, useful in conjunction with a reverse cycle refrigeration unit and/or direct/indirect gas-fired heating as is disclosed in my co-pending International Patent Application No. PCTJ/AU998/00559 entitled "Direct/Indirect Gas Heating of Air".

The refrigeration circuit is preferably of a closed come on circuit type. The invention may be used for cooling a steam of fresh air supplied to the space, in which case the hear exchange unit of the refrigeration circuit at the air outlet acts as a coding evaporator and, the second heat exchange unit of the refrigeration circuit acts as a hot condenser which is cooled by the stream of stale leaving the heat exchanger. The invention is also useable with a reverse-cycle compression refrigeration circuit, in which case the two heat exchange units are each capable of act either as a cooling evaporator or as a hot condenser.

An advantage of the invention is that when the apparatus is operating in a cooling mode so as to provide a stream of cooled fresh air to an enclosed space The thermal efficiency of he closed compression refrigeration circuit is substantially improved as the rate of removal of heat from the hot condenser of tie refrigeration circuit by the stale air strum is greatly increased.

When the apparatus is required to pride tie space with a stream of cool fresh air, the heat-absorbing capacity of the stale air stream is suitably enhanced by cooling and increasing its humidity before it enters the heat exchanger. This may be achieved by means of water sprays. However the preferred way of cooling the stale air stream and increasing its humidity is by passing the stale air stream through a water moistened evaporative cooling pad, such as a CELdek™. A CELdek™ cooling pad provides a multi-channel structure having a large number of air-flow channels extending between its opposite faces. Water is pressed over its surfaces exposed to the stale air stream, typically under the effect of gravity. The air stream absorbs moisture vapor from the cooling pad which in turn is cooled by the absorption of the latent heat of vaporization from the water down through it. The cooling of the pad in this manner cools the stale air stream flowing through it before it enters the heat exchanger and the fresh air streamer is cooled to a lower temperature in the heat exchanger as a consequence.

An apparatus for supplying cooled to an enclosed space is described in detail in my co-pending International Patent Application No PCT/AU95/00315, WO 95/33960 hereby inserted by way of reference.

BRIEF DESCRIPTION OF DRAWING

The invention will now be described in more detail, by way of example only, wit reference to the accompanying drawing (FIG. 1) which is a diagrammatic side elevation illustrating an air cooling/heating apparatus according to a preferred embodiment of the invention.

DESCRIPTION OF PREFERRED EMBODIMENT (S)

Figure 1:
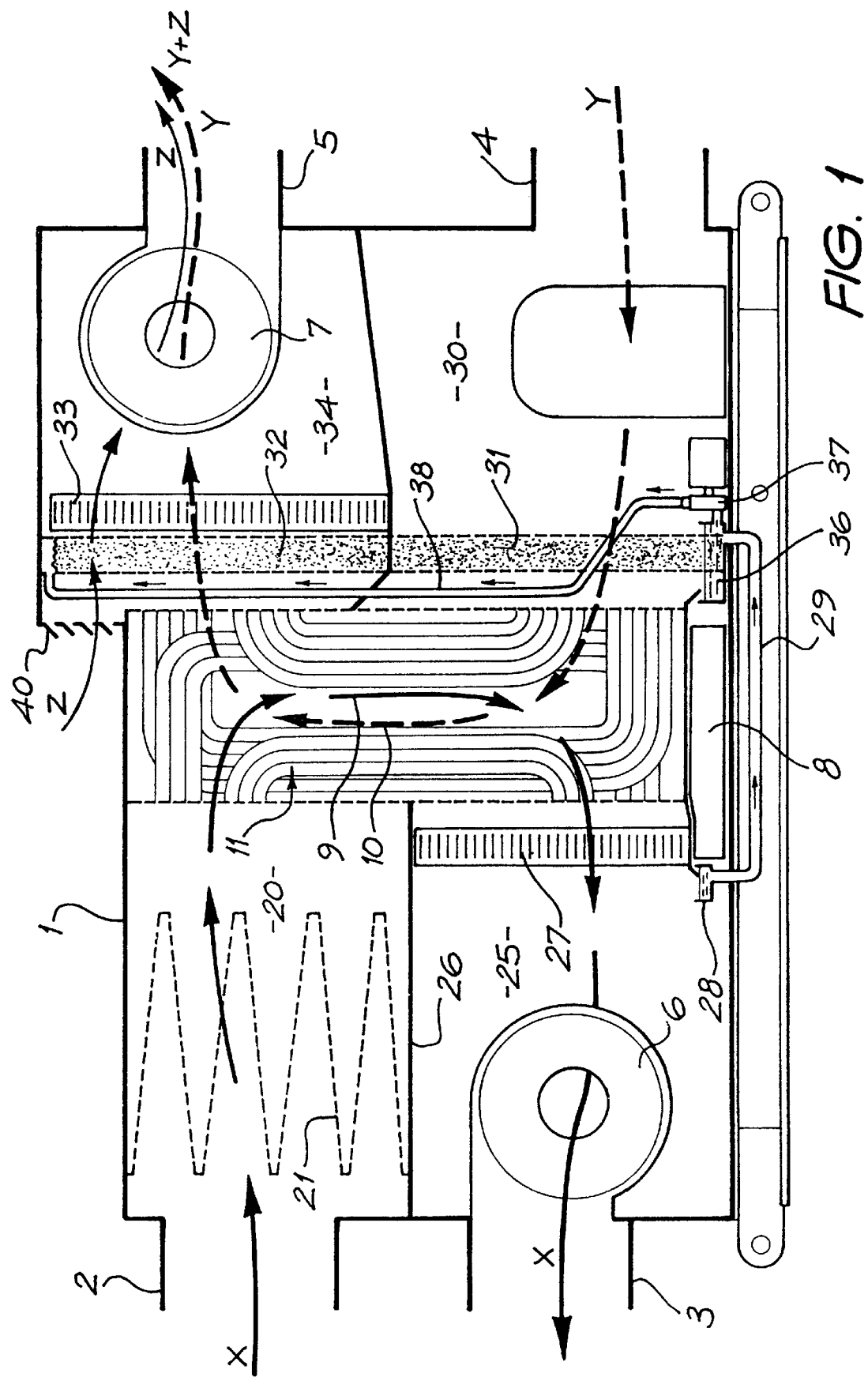

The drawing illustrates a preferred embodiment of the apparatus for supplying a stream of fresh air to an enclosed space which will now be described when operating in a cooling mode. The apparatus is contained within a casing 1 and a stream of fresh air X is drawn into the unit via a fresh air inlet 2 and is subsequently cooled before being passed into the enclosed space via a fresh air outlet 3. A stream of stale air Y is is removed from the enclosed space by way of a return air inlet 4 to the casing, and upon passing through the unit is discharged to atmosphere by way of an exhaust air outlet 5. The casing 1 contains a fist fan 6 located in the fresh air unit of the unit for drawing the steam of fresh air X into and through the unit and supplying the fresh air stream to the enclosed space. The casing 1 further contains a second fan 7 located in the stale air circuit of the unit for drawing the stream of stale air Y into and through the unit and exhausting the stale air via the outlet 5.

The apparatus includes a heat exchanger 8 which features two mutually-isolated and substantially counterflow gas-flow circuits 9 and 10 between which good heat exchange properties exist. Baffles 11 guide the air streams flowing through the heat exchanger to travel along paths which are substantially counterflow to one another so as to maximise the heat transfer between the arrowed circuit 9, along which fresh air stream is passed, and the arrowed secondary circuit 10 through which the stale air stream passes. The baffles 11 in the heat exchange divide the air flow in the heat exchanger into substantially parallel flow paths.

The ambient fresh air stream X drawn though the inlet 2 passes into a first chamber 20 which optionally includes an air filter 21. The fresh air stream passes from the chamber 20 into the primary circuit 9 of the heat exchanger 8. Upon passing through the primary circuit the fresh air stream is cooled by heat transfer to the secondary circuit of the heat exchanger. The cooled fresh air stream leaves the heat exchanger 8 and enters a second chamber 25 separated from the first chamber 20 by a partition 26. The chamber 25 contains the first fan 6 and an evaporator coil 27 forming a first heat exchange unit of the closed compression refrigeration circuit. The evaporator coil 27 provides additional cooling of the fresh air stream. Water condensation forming on the coil 27 is captured in a collector 28 located beneath the coil and is transferred to a reservoir 36 by means of pipe 29.

A stream of stale air Y is drawn from the enclosed space and alters The casing 1 through an inlet 4 and passes into a third chamber 30. The stale air stream is passed through a vertical evaporative cooling pad 31, preferably a CELdek™, which is cooled by having cold water passed down it. The operation of a CELdek™ cooling pad is described in more detail in my previously referred to International PCT Patent Application.

The stale air stream flows through the cooling pad 31 whereupon some of the water passing down through the pad is evaporated into the stale air stream. The extraction of the latent heat of evaporation from the water of the cooling pad 31 acts to cool the stale air stream upon passing through the cooling pad 31 whilst also increasing its humidity. The air stream then passes into the secondary circuit 10 of the heat exchanger 8 whereupon heat is transferred to the fresh air stream from the fresh air stream flowing in counterflow through the primary circuit 9 of the heat exchanger 8.

Upon passing through the heat exchanger 8, the humid stale air stream passes through a secondary evaporative cooling pad 32 and then passes through a condenser coil 33 forming a second heat exchanger unit of the compression refrigeration circuit. The stale air stream finally enters a fourth chamber 34 in the casing from which it is discharged to atmosphere by means of the exhaust fan 7 via the exhaust air outlet 5.

Water from the evaporative cooling coil and the primary wet cooling pad is collected in a reservoir 36. The water is circulated by means of a pump 37 which transfers the water via piping 38 to the head of the secondary wet cooling pad 32. The water is passed down the secondary wet cooling pad 32 under the effect of gravity and then passes down the primary wet cooling pad 31 whereupon it is collected in reservoir 36 and subsequently recirculated. A source of make up water may be connected to the reservoir in order to maintain the water at the desired level.

It should be noted that in one possible embodiment of the invention the primay and secondary cooling pads 31 and 32 are provided by a single cooling pad which spans both the inlet and outlet of the secondary airflow circuit of the heat exchanger 8.

The apparatus described can operate, by modifying the refrigeration circuit in a manner well-known in the art, as a reverse cycle refrigeration circuit. When the fresh air supplied to the enclosed space is to be cooled, it operates as described above. If the fresh air is to be warmed before it enters the enclosed space, the mode of operation of the refrigeration circuit is changed so that the operation of the two heat exchange units formed by the coils 27 and 33 is interchanged and coil 27 operates to heat the fresh air stream.

The unit may include a further fresh air inlet 40 for providing a stream of make up air Z to the condenser coil 33. In embodiment depicted the steam of make up air 41 for the condensing coil enters downstream of the secondary circuit 10 of the heat exchange 8. The condenser coil 33 is preceded by an evaporative cooling pad 32, of the type sold under the made mark CELdek™, which cools the mixed flow air from the heat exchanger and the ambient make up air. This lowers the temperature of the air stream passing the condenser coil 33 and improves its operating efficiency, which in turn lowers the input power of the compressor, thus saving up 20% of the compressor input power.

To increase efficiency when operating in the heating mode, a direct fired gas heating system of the type described in Australian Patent Application No. 50005/96 or an indirect gas heating system of the type described in International Parent Application No. PCT/AU98/00559, may be used.

To improve efficiency if needed, a pre-cooling water coil (not shown) may be located in the stale air stream prior to the cooling pad 31 and heat exchanger 8 to pre-cool the stale air stream being drawn from the enclosed space.

In very cold conditions of zero degrees Celsius or less an indirect gas heating unit can be used as previously mentioned.

In some cars, a rooftop package unit cannot be used due to space limitations or other factors. In such cases, a split system unit i.e., indoor fan coil connected to outdoor condensing unit can be used.

In applications where there is limited height, as for example between floors of buildings, the heat exchanger may be laid down on its side and the same cooling pad may be used to cool air stale air stream both before entering the heat exchanger 8 and upon passing through the heat exchanger before being discharged to the outside via the exhaust fan.

This system has the same bits as the rooftop package except the fan/coil unit are connected by refrigeration pipes and electrical wiring to an outside condensing unit. It can also provide reverse cycle heating and cooling and again, in extremely cold conditions, can have indirect or direct gas heating installed.

Although the invention has been described with reference to specific examples, it will be appreciated by those skilled in the art that the invention may be embodied in many other forms.

What is claimed is:

1. An apparatus for supplying a stream of fresh air to a space whilst simultaneously withdrawing a stream of stale air from the space, said apparatus comprising:

a fresh air inlet through which a stream of fan driven fresh air enters the apparatus;

a supply outlet through which said stream of fresh air leaves the apparatus and is passed into the space;

a stale air inlet through which a stream of fan driven stale air is withdrawn from said space;

a stale air outlet through which said stale air is returned to atmosphere;

an air-to-air heat exchanger provided with mutually isolated primary and secondary air flow circuits and adapted to provide heat transfer between said primary and secondary air flow circuits;

a first air flow path extending between said fresh air inlet and said supply outlet and formed in part by the primary air flow circuit of said air-to-air heat exchanger;

a second air flow path extending between said stale air inlet and said stale air outlet and formed in part by the secondary air flow circuit of said air-to-air heat exchanger;

a closed compression refrigeration circuit including a first heat exchange unit located in said first air flow path downstream of said primary air flow circuit of said air-to-air heat exchanger and a second heat exchange unit located in said second air flow path downstream of said secondary air flow circuit of said air-to-air heat exchanger;

a first evaporative cooling pad located in the second air flow path downstream of said secondary air flow circuit of said air-to-air heat exchanger and before the second heat exchange unit of the closed compression refrigeration circuit;

a second evaporative cooling pad, the second evaporative cooling pad being moistened with water for increasing the humidity of the stale air stream before it enters the secondary air flow circuit of the air-to-air heat exchanger; and means for collecting and transferring condensation forming on the first heat exchange unit to the first evaporative cooling pad to moisten the pad, and wherein the first and second evaporative cooling pads are provided by a single evaporative cooling pad.

2. The apparatus as claimed in claim 1 wherein the flow of stale air is supplemented by a flow of fresh ambient air before passing through the second heat exchange unit of the closed compression refrigeration circuit.

3. The apparatus as claimed in claim 1 wherein the closed compression refrigeration circuit is capable of reverse cycle operation to selectively provide warm or cool air to the space.

4. The apparatus as claimed in claim 1 wherein said apparatus is contained within a casing, said casing including the fresh air inlet, the supply outlet, the stale air inlet and the stale air outlet.

5. The apparatus as claimed in claim 4 wherein the casing includes a first chamber in fluid communication with the air inlet and the primary air flow circuit of the air-to-air heat exchanger so as to form part of the first air flow path, said first chamber including an air filter through which said fresh air stream is passed before entering the primary air flow circuit of the air-to-air heat exchanger.

6. The apparatus as claimed in claim 5 wherein upon the fresh air stream leaving the air-to-air heat exchanger it enters a second chamber which contains the first heat exchange unit of the closed compression refrigeration circuit.

* * * * *